March 27, 1934.  T. H. MARTEN  1,952,084
DEVICE FOR PRODUCING THE VISUAL ILLUSION
OF SPACE IN PROJECTED MOTION PICTURES
Filed April 15, 1932  3 Sheets-Sheet 1
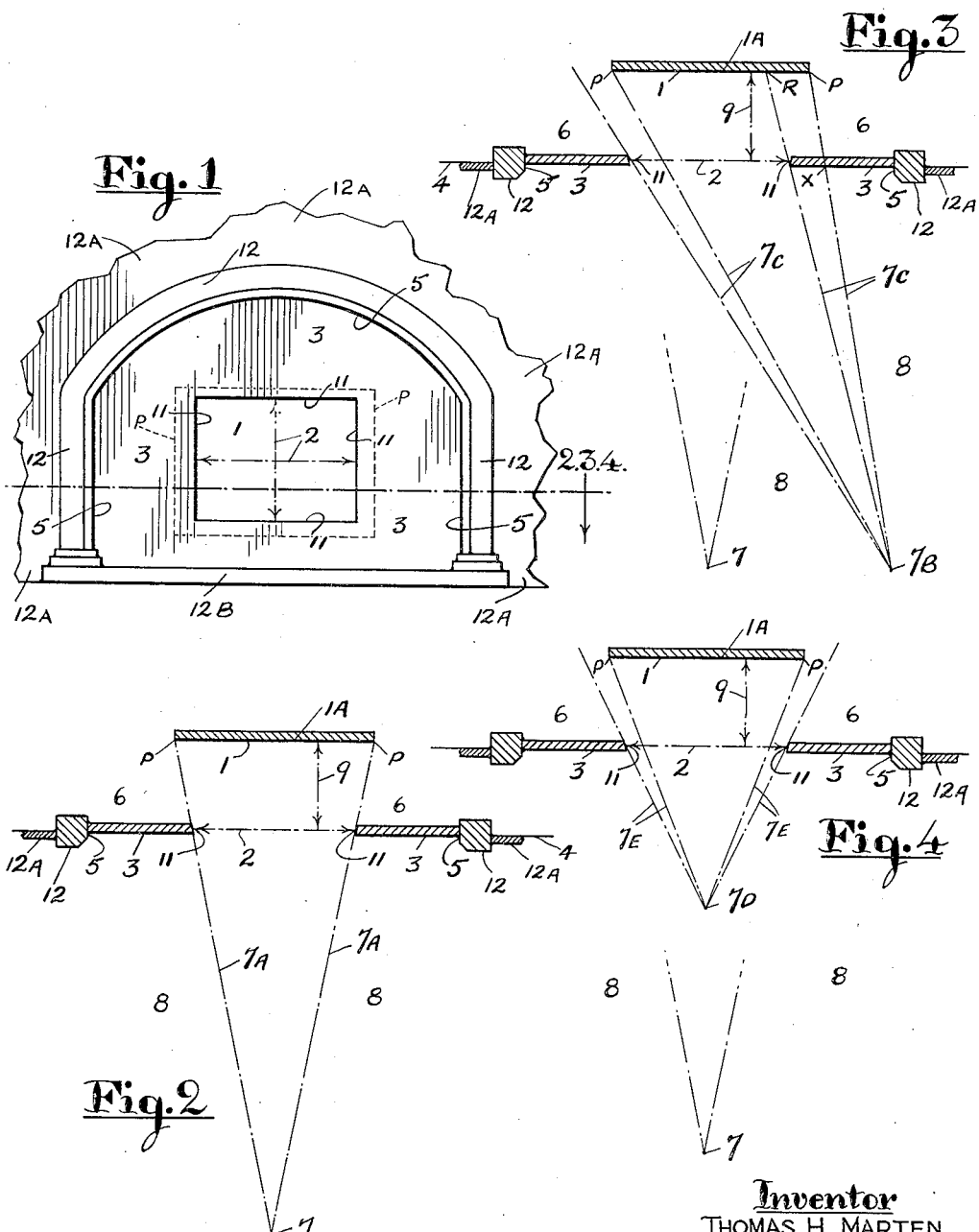
Inventor
THOMAS H. MARTEN
By Marks and Clerk,
His Attorneys.

March 27, 1934.   T. H. MARTEN   1,952,084
DEVICE FOR PRODUCING THE VISUAL ILLUSION
OF SPACE IN PROJECTED MOTION PICTURES
Filed April 15, 1932   3 Sheets-Sheet 2
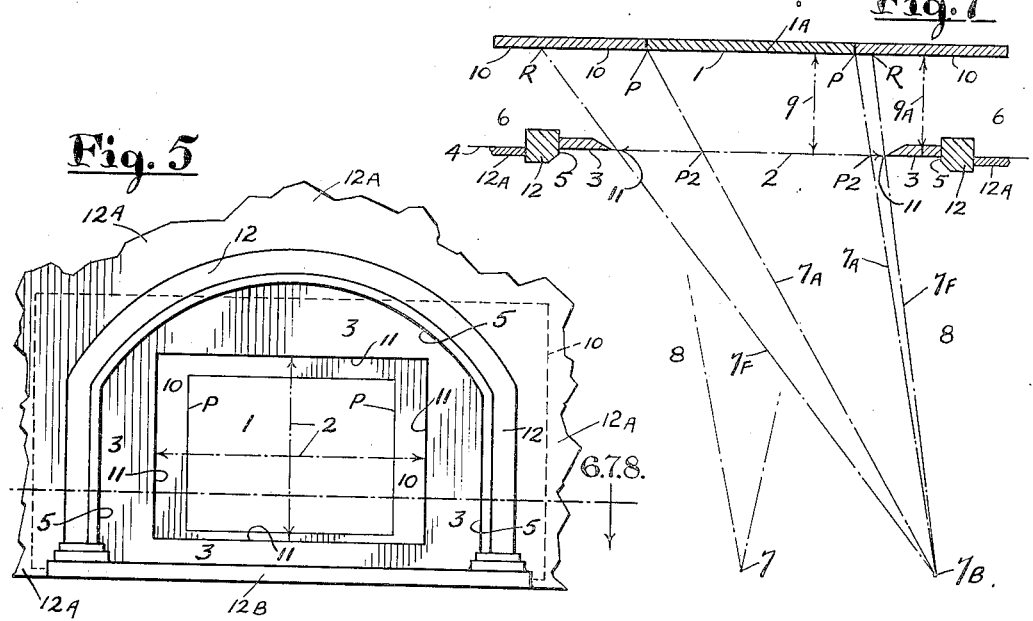
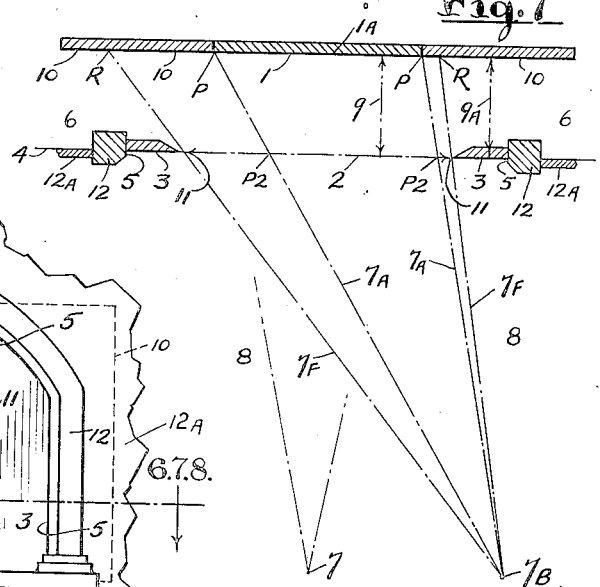
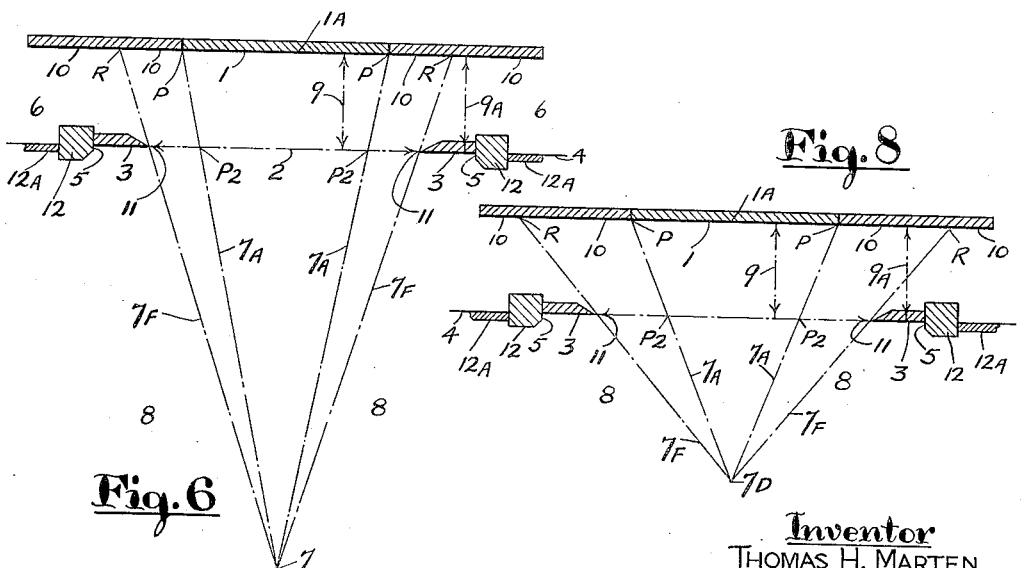
Inventor
THOMAS H. MARTEN
By Marks and Clerk,
His Attorneys.

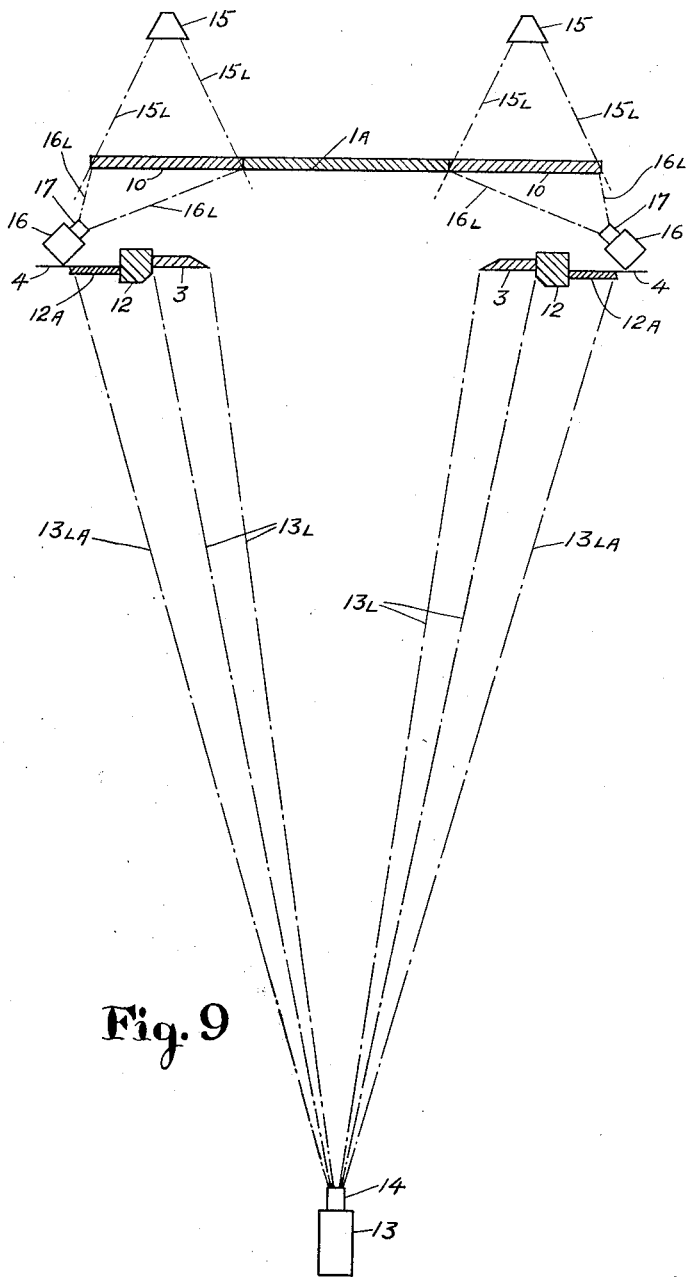

Patented Mar. 27, 1934

1,952,084

UNITED STATES PATENT OFFICE 1,952,084

DEVICE FOR PRODUCING THE VISUAL ILLUSION OF SPACE IN PROJECTED MOTION PICTURES

Thomas H. Marten, Toronto, Ontario, Canada, assignor to Geoffrey Teignmouth Clarkson and Isaac Ernest Weldon, both of Toronto, Ontario, Canada Application April 15, 1932, Serial No. 605,510

20 Claims. (Cl. 88—24)

My invention relates to the presentation of motion pictures in the theatre.

The principal object of my invention is the production of the visual effect of depth, commonly called the stereoscopic effect, or, the effect of the third dimension of space, so that the picture will lose its present characteristic appearance of flatness and so that the figures will no longer appear to move upon a screen but will appear to move within a space.

Another, but important and related, object of my invention is the improvement of the illumination of the auditorium with particular respect to the general vision field of the spectator with relation to the picture. The achievement of the two objects are effected coincidentally by the same means.

By "depth" "stereoscopic effect" "third dimension" "space" I mean the visual illusion within the picture of that particular dimension having its direction "toward" and "away from" the spectator. For common understanding I refer to this apparent dimension as "space".

My invention contemplates the use of any standard form of picture made and projected in the usual manner, or any picture made and projected in any manner convenient for the purpose as set forth.

Throughout the description and claims I avoid unnecessary use of technical terms so that my invention may be clearly understood by persons not possessing special knowledge of the subject.

My invention has resulted from years of study and experiment and should be understod as representing the sum of much complex data. Thus, its practical embodiment, although apparently simple, will be found, upon analysis, to follow closely certain complex visual laws embraced in the following definition of its theory.

"All visual phenomena is, in the final analysis, perception, and all perceptive reaction is mental. If the spectator be made space conscious with relation to the picture then the picture will assume a space aspect in the mind of the spectator."

My invention, in its practical embodiment, constitutes a device which sets up a new psycho-physical visual condition between picture and spectator in accordance with the foregoing definition of its theory. With its use the theatre-auditorium and the picture-setting combine to form a new visual instrument arranged to produce in the mind of the spectator the illusion of space within the picture.

In the accompanying drawings:—

Figures 1 and 2 are, respectively, a front elevation and a diagram in plan showing the theoretical arrangement upon which the principle of my invention is based.

Figures 3 and 4 are, respectively, diagrams in plan of the arrangement shown in Figures 1 and 2 but for different positions of the spectator.

Figures 5 and 6 are, respectively, a front elevation and a diagram in plan showing the arrangement of the practical embodiment of my invention.

Figures 7 and 8 are, respectively, diagrams in plan of the arrangement shown in Figures 5 and 6 but for different positions of the spectator.

Figure 9 is a diagram in plan showing the method of illumination of the parts of my invention.

Similar figures and letters of reference indicate corresponding parts in the drawings.

Before describing the practical embodiment of my invention I will describe its theoretical arrangement in a theatre in order that the principle, as laid down by the definition of theory forming the basis of the practical embodiment, may be clearly understood.

Referring to Figures 1 and 2 of the drawings:—If a picture 1 in a theatre is viewed through an opening 2 (as indicated by the dot-and-dash arrow lines 2) in a visible wall, or mask 3, erected at, or near, the front curtain-line 4 filling the proscenium 5 and enclosing the stage 6, and the picture screen 1A is situated (as shown more particularly in Figure 2) behind the opening 2 with the spectator 7 situated in the auditorium 8 (as shown in Figure 2) in front, and approximately centrally, of the opening, and with the edges 11 of the opening 2 in perfect visual alignment between the spectator 7 and the boundaries P of the picture 1 as indicated by the dot-and-dash visual lines 7A, 7A, and if no part of the opening 2 embraces, visually, more than the area of the picture 1, the space 9 (indicated by the dot-and-dash arrow line 9) extending between the plane of the wall, or mask, 3 and the picture-screen 1A, will promote and hold in the mind of the spectator the "idea" that the space 9 belongs with the objects forming the picture 1 and they will appear to move, stand, etc., in space.

The explanation of the illusion, as embraced in the definition of theory, is found in the fact that the spectator (7) is made "space conscious with relation to the picture" (1), that is to say:—There is set up in the mind of the spectator the "idea" that there is a space (9) associated with the objects of the picture (1) which is not associated with any other group of objects. This space (9) cannot be interpreted as part of the auditorium (8) because the wall, or mask, (3) encloses and separates it.

By "wall" or "mask" I mean a structure presenting a surface to the eye of the spectator such as a thin wood partition, or frame, or it may be a cloth screen suitably stretched on a supporting frame.

Under the conditions described the spectator (7) regards the picture (1) through the space (9) which the mind accepts as part of the structure of the picture (1) and, owing to established habits of rapid association, the mind combines the space (9) with the objects forming the picture (1). The result is "the visual illusion of space within the picture."

My invention is based upon the foregoing visual illusion. It is obvious, however, that a wall, or mask, of the theoretical form described would have no practical value in a theatre because it could not be effective from more than one point in the auditorium. From all other points the boundaries P of the picture 1 and the edges 11 of the opening 2 would not be in visual alignment.

Referring to Figure 3 of the drawings:—

If the spectator moved to the right, (as indicated at 7B), a part of the picture on that side (extending between P and R) would be obscured by the wall, or mask 3, (between 11 and X) and there would be a corresponding visual gap between boundary P of the picture and edge 11 of the opening 2 of the wall, or mask, on the opposite side. This condition is indicated by the dot-and-dash visual lines 7C, 7C. The reverse would be the case if the spectator 7B moved over to the left of the center.

If the spectator moved upwardly or downwardly the same character of visual delignment would occur with respect to the upper and lower parts of the picture. This is illustrated by turning Figure 3 sideways to the right or left thus representing the character of a diagrammatic side elevation.

Referring to Figure 4 of the drawings:—

If the spectator moved toward the picture 1, as indicated at 7D, the opening 2 in the wall, or mask 3, would become visually larger than the picture 1, as indicated by the dot-and-dash visual lines 7E, 7E, and there would be a corresponding visual gap between the boundaries P of the picture and the edges 11 of the wall, or mask 3. By moving away from the picture a distance greater than that shown at 7 the reverse would be the case.

In all positions of the spectator, except the primary position 7 and all positions backwardly on the same visual axis with the position 7, the visual illusion of space within the picture 1 would be impaired or destroyed.

I mention these visual results with respect to the theoretical wall, or mask 3, because my invention of the means to duplicate the character, or quality, of the visual illusion set up by it for the primary position of the spectator 7, but for every position in the auditorium equally, constitutes a practical embodiment of the theory and principle and a full achievement of the object of the invention as first recited.

In the practical embodiment of my invention I use two walls, or masks, so arranged in combination with the picture that the character of the visual effect and illusion created by the single theoretical wall, or mask, is presented to the spectator with, however, the following important additional visual illusion:—

If the spectator changes position in the auditorium the opening in the wall, or mask, will appear to retain visual alignment with the picture, that is to say:—the opening will appear to change its position with the spectator and will present a visual alignment with the picture for every point in the auditorium. The effect is produced by the following change in structure from that described for the theoretical wall, or mask.

Referring to Figures 5, 6, 7 and 8 of the drawings:—the opening 2 in the wall, or mask, 3, is of such dimensions that the picture 1, situated a substantial distance behind, is visible from all necessary maximum angles in the auditorium 8.

In the plane of the picture-screen 1A, and extending from the picture boundary P on all four sides, I provide a second wall, or mask 10, which reaches to right and left, and upwardly and downwardly, a distance in each case calculated to pass beyond the intersection R with any possible line of vision extending from any spectator in the auditorium 8 through any point on the inner edges 11 of the wall, or mask 3, which forms the large opening 2. Two such lines of vision are indicated by the dot-and-dash lines 7F, 7F, extending between the spectator at 7, 7B, 7D, and the wall, or mask 10.

The inner edges 11 forming the opening 2 in the wall, or mask 3, are sharpened, as shown, to present no visible thickness.

It will now be clear that if the two walls, or masks, 3 and 10 are visible to the spectator at 7, 7B, 7D, and if the surface of each is approximately the same apparent texture, color, and brightness of the other, it will be difficult for the spectator to distinguish where they visually meet at the intersection R of the edge 11 with the surface of the wall, or mask, 10, that is to say:— the edges 11 will tend to be invisible and (thus) Figure 5 will have the visual effect of Figure 1, and this will continue to be the case from any point in the auditorium 8 to which the spectator may move, as clearly shown by reference particularly to Figures 6 and 7.

If the spectator moved upwardly or downwardly the same character of visual effect would occur with respect to the upper and lower parts of the two walls, or masks, 3 and 10. This is illustrated by turning Figures 6 and 7 sideways to the right or left thus representing the character of diagrammatic side elevations.

The wall, or mask, 10, in reality in plane with the picture 1, is accepted by the mind of the spectator as being in plane with, and an integral part of, the wall, or mask 3, that is to say:—the parts of the wall, or mask 10, extending on each side of the picture and likewise at the top and bottom between the picture boundary P and the intersection R are accepted by the mind of the spectator as having been (in effect) brought forward and fitted into each side of the opening 2 between the edges 11 and the visual boundary P2 of the picture, thus visually reconstructing the character of the original real condition presented by the theoretical wall, or mask, 3, as shown in Figure 2, but for every position in the auditorium equally, that is to say:—there is presented the visual illusion of a wall or mask having an opening which appears to change its position centrally of the wall or mask according to the position of the spectator.

The explanation of this visual illusion rests in the fact that the spectator cannot avoid knowledge of the real position of the wall, or mask 3, because of its visible connection with the architecture 12 of the auditorium 8, and because no such architecture is visibly associated with the wall, or mask 10, to disclose its real position, and particularly because of the apparent uniformity of the texture, color, and brightness of the surfaces of the two walls, or masks, 3 and 10.

The spectator regards the picture with the same "set of the mind" as described for the theoretical wall, or mask. The real space 9A extending between the two walls, or masks, 3 and 10, is unknown to the spectator and will remain unknown provided no markings, designs, etc., are used on the surfaces of the walls, or masks, to induce any form of visual confusion. The space 9 in reality extending between the same two planes but in the visual path of the picture is accepted by the mind of the spectator as tending to bear the same relation to the plane of the wall, or mask 10, as it bears the plane of the wall, or mask 3, and the resulting space-consciousness is confined to the picture area with the same character, or quality, of visual illusion as in the case of the theoretical wall, or mask, 3, Figures 1 and 2.

I do not state that the magnitude of the space-consciousness will be the same for every spectator under any or all of the conditions described or that it will be the same for one spectator in the case of the practical double wall, or mask, as compared with the single theoretical wall, or mask. Under the two conditions compared the "magnitude" of the space-consciousness appears to change in some cases and in other not at all. It is clearly demonstrated, however, that in all cases, and for all spectators, the "quality" of the space-consciousness is the same, that is to say:— the visual illusion of space within the picture is presented.

It is obvious that my reference to one spectator moved from point to point is intended to represent any number of spectators located at any number of points coincidentally throughout the auditorium.

Referring to Figure 9 of the drawings:—

To illuminate the outer wall, or mask 3, I use, preferably, a projector 13, located in the regular projection booth, provided with a lens 14 to properly focus the light on the surface while shutting it off from passing through the opening 2 as indicated by the dot-and-dash lines 13L.

To illuminate the inner wall, or mask 10, I find it convenient under some conditions to use the lamps 15 (which may be any number of lamps), arranged to pass the light through from behind, as indicated by the dot-and-dash lines 15L, in which case the wall, or mask, is made of transparent materials such as cloth dyed the desired color, etc. Under other conditions I use the projectors 16, (which may be any number of projectors) arranged between the two walls, or masks, 3 and 10, but out of sight of the spectators, each provided with a lens 17, to properly focus the light on the surface of the wall, or mask 10, while shutting it off from falling upon any part of the picture, as indicated by the dot-and-dash lines 16L.

It is understood the picture is projected in the usual manner as previously stated.

There should be sufficient illumination of the proscenium-arch 12, and base 12B, and auditorium structure 12A, etc., immediately adjoining and surrounding the outer wall, or mask 3, to provide for an accurate estimate by the spectator of the exact location of the wall, or mask, 3. The illumination of these parts of the auditorium need not be in the same color as the surfaces of the two walls, or masks, 3 and 10, but should be in harmony with them in respect to both color and brightness and should be effected by light projected on them. For convenience this light might also come from the projector 13 as indicated by the dot-and-dash lines 13LA.

The light reflected from the combined parts, that is to say:—from the two walls, or masks, 3 and 10, together with the parts of the auditorium structure mentioned, constitute an important influence for good upon the auditorium illumination with respect to general visual conditions during presentation of the picture.

Under these conditions of illumination the tone, definition, and particularly the contrast values, of the picture 1, are substantially improved and if a suitable contrasting apparent texture or visual roughness is introduced into, or upon, the surfaces of the walls, or masks, 3 and 10, it has the effect of visually smoothing out, and rendering less apparent by contrast, the texture or grain otherwise apparent in the magnification of the film structure of the picture. All of this combined illumination surrounding the picture achieves the secondary object of my invention as recited.

The faces of the walls, or masks, 3 and 10, are of similar apparent color, texture, and brightness as previously set forth. They may be made from the same materials unless the inner wall, or mask 10, is required to be transparent. The degree of brightness of the surfaces is very important and can only be established by trial in combination with the color desired and in some cases by trial with the picture. It is of course understood that these surfaces reflect light approximately uniformly to all spectators equally in the auditorium.

I find it convenient in some cases where extreme purity of color is desirable to illuminate the surfaces of the walls, or masks, with light of the same color as that with which the surfaces have been painted. In practice I illuminate the inner wall, or mask 10, to best suit the requirements of the picture and follow this by adjustment of the illumination of the outer wall, or mask 3, to produce an approximate visual match. This tends to render invisible the sharpened edges 11 of the wall, or mask 3, against the surface of the wall, or mask, behind.

It is understood I do not restrict myself as to the structure, color, or brightness, I may use in adapting my invention to practice. Many modifications coming within the scope of the appended claims are possible, such, for instance, as the use of curved or angular surfaces, etc., or a plurality of walls, masks, frames, or screens, of any number. The essence of my invention resides in placing between the spectator and the picture plane a visible wall, or mask, having an opening through which another wall, or mask, closely surrounding the picture, is visible with the picture, in combination with a space separating the two walls or masks, and means for causing the spectator to tend to regard the two walls, or masks, as being one wall or mask.

I claim:—

1. In a device for producing in a theatre the visual illusion of space in projected pictures the combination with a picture-screen of a frame surrounding the screen in approximately the same plane therewith, a second frame visually surrounding the first-mentioned frame in a plane spaced forwardly of the first-mentioned frame and means for illuminating the two frames.

2. In a device for producing in a theatre the visual illusion of space in projected pictures the combination comprising a picture-screen, a second screen surrounding the picture-screen in approximately the same plane therewith, a third screen in a plane spaced forwardly of the first and second mentioned screens having a centrally disposed opening therein through which the picture-screen and immediately surrounding portions of the second mentioned screen are visible from the auditorium and means for illuminating the second and third mentioned screens.

3. In a device for producing in a theatre the visual illusion of space in projected pictures, the combination with a picture-screen of a wall, or mask, surrounding the picture-screen in approximately the same plane therewith, a second wall, or mask, standing in front of, and approximately paralleling the first mentioned wall, or mask, and having a centrally disposed opening therein through which the picture-screen and immediately surrounding parts of the first mentioned wall, or mask, are visible from the auditorium, together with a space separating the two walls, or masks, and means for illuminating the walls, or masks.

4. In a device for producing in a theatre the visual illusion of space in projected pictures, the combination with a picture-screen of a wall, or partition, in approximately the same plane with and surrounding the picture-screen, a second wall, or partition, standing in front of, and approximately paralleling the first mentioned wall, or partition, and having a centrally disposed opening therein through which the picture and adjacent parts of the first mentioned wall, or partition, are visible from the auditorium, together with a space separating the two walls, or partitions, and means for illuminating both walls, or partitions, so that each wall, or partition, when viewed from the auditorium, tends to be visually indistinguishable from the other wall, or partition.

5. In a device for producing in a theatre the visual illusion of space in projected pictures the combination comprising placing between the spectator and the picture a visible wall, or partition, having an opening through which a second wall, or partition, in the same plane with and surrounding the picture, is visible with the picture, together with a substantial space separating the two walls, or partitions, and means for illuminating the two walls, or partitions, to cause the spectator to tend to regard the two walls, or partitions, as being one combined wall, or partition.

6. In a device for producing in a theatre the visual illusion of space in projected pictures the combination comprising placing between the spectator and the picture a visible wall, or partition, having a centrally disposed opening through which a second wall, or partition, in the same plane with and closely surrounding the picture is visible with the picture, a space separating the two walls, or partitions, means for illuminating the two walls, or partitions, so that they will appear approximately the same color, texture, and brightness, together with sharp edges forming the opening in the first mentioned wall, or partition, to cause the spectator to tend to regard the two walls, or partitions, as being one wall, or partition, and means for illuminating the part of the auditorium structure directly adjacent the first mentioned wall, or partition, so that the spectator may estimate the location of the first mentioned wall, or partition.

7. In a device for producing in a theatre the visual illusion of space in projected pictures the combination with a picture-screen of a wall, or partition, in approximately the same plane with and surrounding the picture-screen, a second wall, or partition standing in front of and approximately paralleling the first mentioned wall, or partition, and having a centrally disposed opening therein through which the picture and adjacent parts of the first mentioned wall, or partition are visible to all spectators in the auditorium, the height and breadth of the first mentioned wall, or partition, being greater than the visual height and breadth of the opening in the second mentioned wall, or partition, from any point in the auditorium so that the outer edges of the first mentioned wall, or partition, will remain visually hidden from any spectator in the auditorium by the second mentioned wall, or partition, together with a space separating the two walls, or partitions, and means for illuminating the two walls, or partitions, so that they will tend to appear of the same color, texture, and brightness, to cause the spectators to tend to regard the two walls or partitions, as being one wall, or partition.

8. In a device for producing in a theatre the visual illusion of space in projected pictures the combination with a picture of the visual illusion of a wall, or partition, having an opening which appears to change its position centrally of the wall, or partition, according to the position of the spectator and having the picture exhibited in the opening.

9. In a device for producing in a theatre the visual illusion of space in projected pictures the combination with a picture-screen of a space disposed between the picture-screen and the spectators and extending from the picture-screen towards the spectators a distance determined by the plane of a fully surrounded opening in a visible wall, or partition, situated between the spectators and the picture-screen the picture being projected upon the picture-screen and exhibited to the spectators through the opening.

10. In a device for producing in a theatre the visual illusion of space in projected pictures the combination with a picture-screen of a space disposed between the picture-screen and a moving spectator and extending from the picture-screen toward the spectator a distance determined by the plane of a fully surrounded opening in a visible wall, or partition, situated between the spectator and the picture-screen, the picture being projected upon the picture-screen and exhibited to the spectator through the opening, and means for maintaining apparent visual alignment of the opening between the picture and the spectator throughout all the movements of the spectator.

11. In a device for producing in a theatre the visual illusion of space in projected pictures the combination comprising a visible wall, or partition, disposed between a multiplicity of spectators and the picture-screen, a fully surrounded opening in the wall, or partition, through which the picture is visible to all the spectators, a space extending between the plane of the opening and the picture-screen and means for producing apparent visual alignment of the opening between the picture and each of the spectators, the said means comprising a frame surrounding the picture and in approximately the same plane therewith, the said frame being visible through the said opening coincidently with the picture and visually forming a part of the said wall, or partition.

12. A device for exhibiting projected pictures in a theatre comprising a picture-surface upon which the pictures are exhibited, an illuminated framing-surface surrounding the picture-surface in approximately the same plane therewith, a second illuminated framing-surface visually surrounding the first mentioned framing surface in a plane forwardly thereof and extended in the same plane to partially visually overlap the first mentioned framing-surface.

13. A device for exhibiting projected pictures in a theatre comprising a picture-surface upon which the pictures are exhibited, a framing-surface surrounding the picture-surface in approximately the same plane therewith, a second framing-surface visually surrounding the first mentioned framing-surface in a plane forwardly thereof and extended to partially visually overlap the first mentioned framing-surface and means for illuminating the two framing-surfaces to approximately match each other in texture, color, and brightness in combination with invisible inner edges to the second mentioned framing-surface.

14. A device for exhibiting projected pictures in a theatre comprising a picture-surface upon which the pictures are exhibited, a framing-surface surrounding the picture-surface in approximately the same plane therewith, a second framing-surface surrounding the first mentioned framing-surface in a plane forwardly thereof and extended inwardly to partially overlap visually the first mentioned framing-surface, light sources positioned to illuminate the first mentioned framing-surface, a separate light source positioned to illuminate the second mentioned framing-surface, all the light sources being arranged to control the illumination of the two framing-surfaces relatively to tend to match each other as to apparent texture, color, and brightness, in combination with approximately invisible inner edges to the second mentioned framing-surface so that the two framing-surfaces will tend to appear combined as one framing-surface.

15. A device for producing in a theatre the visual illusion of space in projected pictures comprising a screen upon which the pictures are exhibited in combination with two frames visually surrounding the screen, the two frames being in separate planes, together with means causing the two frames to tend to appear in the same plane.

16. A device for producing in a theatre the visual illusion of space in projected pictures comprising a screen upon which the pictures are exhibited in combination with a plurality of frames visually surrounding the screen, the frames being each in a separate plane, together with means causing the plurality of frames to tend to appear in one common plane.

17. A device for producing in a theatre the visual illusion of space in projected pictures comprising a screen upon which the pictures are exhibited in combination with a frame visually surrounding the screen and positioned substantially forwardly of the screen together with a second visible frame surrounding the screen and positioned approximately in the same plane with the screen and means for illuminating the two frames so that the extent of the space separating the two frames will be unknown to a spectator in the auditorium.

18. A device for producing in a theatre the visual illusion of space in projected pictures comprising, in combination with a screen upon which the pictures are exhibited, a visible frame surrounding the screen, the said frame being composed of a plurality of visible surfaces positioned relatively in a plurality of planes, together with means arranged to cause the said plurality of visible surfaces to appear in a single common plane.

19. A device for producing in a theatre the visual illusion of space in projected pictures comprising a screen upon which the pictures are exhibited in combination with a plurality of visible frames having openings of different sizes visually surrounding the screen and positioned progressively forwardly of the screen, with a space between the frames in the forwardly direction, the frame with the smallest opening being positioned approximately in the same plane with the screen and the frame with the largest opening being positioned the farthest forwardly of the screen together with means for illuminating the forward surfaces of the frames so that they will tend to appear collectively in the plane of the forward frame.

20. A device for producing in a theatre the visual illusion of space in projected pictures comprising a screen upon which the pictures are exhibited in combination with a space-interval extending between the plane of the screen and a plane established nearer the spectator by the presence of a fully surrounded opening in a wall or partition through which the picture upon the screen is viewed.

THOMAS H. MARTEN.